H. N. MOODY.
WATER HEATER.
APPLICATION FILED MAY 1, 1909.

956,989.  Patented May 3, 1910.

Witnesses: Percy J. Heines, O. H. Miller

Inventor: Howard N. Moody
By J. F. Baldwin, Attorney

UNITED STATES PATENT OFFICE.

HOWARD N. MOODY, OF NEW ORLEANS, LOUISIANA.

WATER-HEATER.

956,989.   Specification of Letters Patent.   Patented May 3, 1910.

Application filed May 1, 1909. Serial No. 493,294.

*To all whom it may concern:*

Be it known that I, HOWARD NADIN MOODY, a citizen of the United States, residing at New Orleans, in the parish of Orleans and State of Louisiana, have invented certain new and useful Improvements in Water-Heaters, of which the following is a specification.

The object of my invention is to provide a water heater of simple construction, of compact and convenient size and shape, and economical and effective in providing for the exposure of a larger superficial area of water to the heating surfaces.

Figure 1:
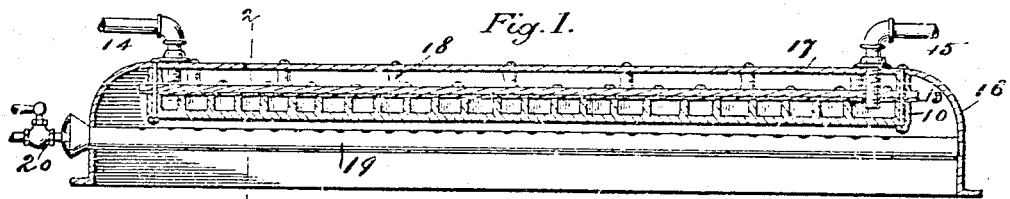
Figure 2:
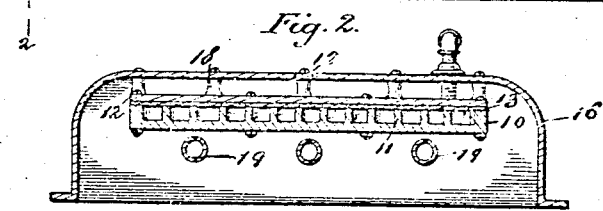
Figure 3:
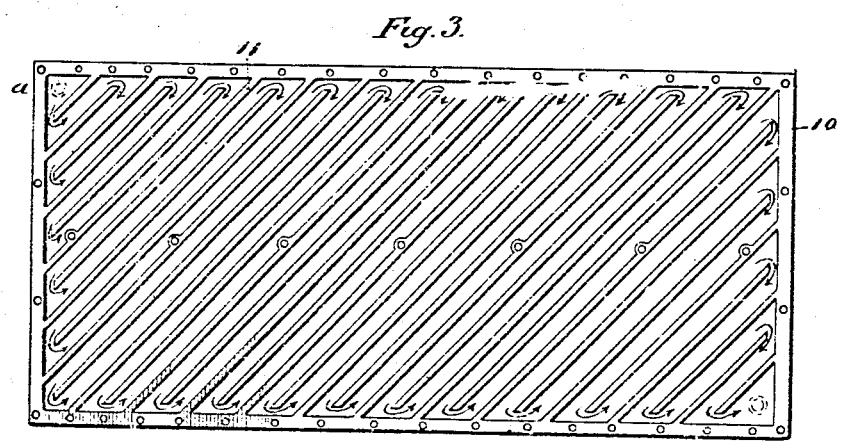
Figure 4:
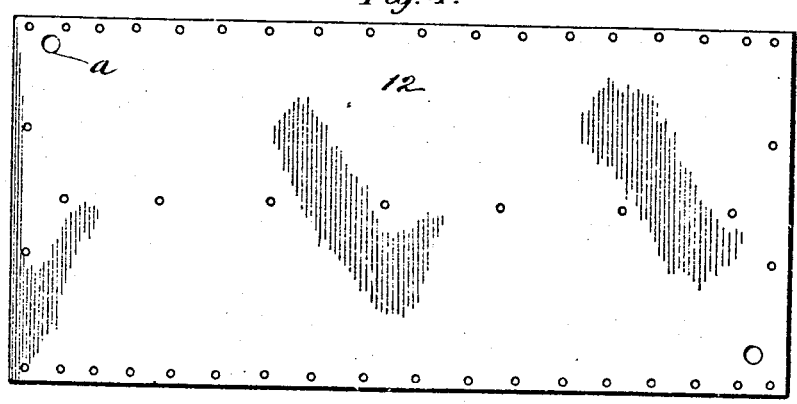

In the accompanying drawings; Figure 1 is a side view of a longitudinal section through the heater. Fig. 2 is a view of a cross section on the line 2—2 of Fig. 1. Fig. 3 is a plan of the water receptacle or pan, the cover being removed. Fig. 4 is a plan view of the cover.

Referring to the drawings 10 indicates the receptacle or pan in which the water is heated, comprising a casting or a stamping preferably of brass composition, rectangular in shape and of any desired depth. The interior of the pan is provided with the diagonal deflecting ribs 11, which extend alternately from the opposite sides of the pan to terminate adjacent the other side, the space between the end of the rib and the side of the pan being substantially equal to the space between any two adjacent ribs. These ribs divide the interior of the pan to provide a continuous water channel which begins at one corner of the pan and terminates at the other diagonal corner, the diagonal arrangement of the ribs providing a channel of greater length relative to the area of the pan than if the ribs were arranged to extend inwardly at a right angle to the sides of the pan. It is also to be noted that the diagonal arrangement of the ribs provides for the graduated and progressive heating of the water, as the cold water entering at the corner *a* passes between ribs of increasing length and of corresponding intensity of heat; also that any change in the temperature of the entering water, such as increased coldness which would produce contraction of the parts, exerts its effect upon the shortest ribs which are most capable to adjust themselves to such contraction without fracture. A cover 12 is provided for the pan and is arranged to be secured thereto by screws entering the sides of the pan, and if desired certain of the ribs may be arranged also to receive screws to secure the central portion of the cover. A pad 13 of asbestos packing is preferably employed beneath the cover to provide a tighter joint between the cover and the sides of the pan and the upper portions or edges of the ribs. The pipe connections 14 and 15 affording the cold water inlet and the hot water outlet are tapped into the proper diagonal corners of the cover. By connecting the inlet and outlet pipes with the cover any desired size of connection may be employed irrespective of the depth of the pan.

16 is a casing and support for the pan of metal preferably lined with asbestos mill board not shown in the drawings and provided with heat escape openings 17 in its top, the pan being supported in the casing by bolts 18.

As a means for heating the pan I provide the burners 19 which are perforated tubes supported in the casing beneath the pan and supplied from the nozzles 20 with any desired combustible. The heat from these burners is applied beneath the pan and the heated gases ascend around the sides and over the top of the pan to escape from the draft openings 17.

The heater may be used in any system or arrangement for supplying hot water, and several heater units may be inter-connected to secure a greater capacity or intensity of hot water supply.

Having thus described my invention, I claim:—

1. A water heater comprising a rectangular pan having diagonal ribs extending alternately from opposite sides to provide a continuous winding channel extending from one corner of the pan to the opposite diagonal corner, said ribs being of a minimum length at the beginning of the channel thence increasing gradually to a maximum in the central portion and thence decreasing again to a minimum at the termination, and a cover for said pan provided with inlet and outlet connections leading to and from the above mentioned channel.

2. A water heater comprising a rectangular pan having diagonal ribs extending alternately from the sides, the ribs decreasing in length at opposite corners and each rib terminating short of the opposite side to leave a space of substantially equal area to the space between the ribs thereby providing a continuous channel of constant area leading from one corner of the pan to the opposite diagonal corner and winding from one side to the other of said pan, a cover for said pan provided with inlet and outlet connections leading into and from said channel, and a supporting casing for the pan.

In testimony whereof I affix my signature in presence of two witnesses.

HOWARD N. MOODY.

Witnesses:
PERCY J. HEINES,
LOTTIE SCHARFSCHWERDT.